United States Patent
Yamamura et al.

(10) Patent No.: US 7,200,481 B2
(45) Date of Patent: Apr. 3, 2007

(54) DRIVING ASSIST SYSTEM FOR VEHICLE

(75) Inventors: Tomohiro Yamamura, Yokohama (JP); Erwin R. Boer, San Diego, CA (US)

(73) Assignee: Nissan Motor Co., Ltd., Kanagawa-Ken (JP)

(*) Notice: Subject to any disclaimer, the term of this patent is extended or adjusted under 35 U.S.C. 154(b) by 85 days.

(21) Appl. No.: 10/715,483

(22) Filed: Nov. 19, 2003

(65) Prior Publication Data
US 2004/0172185 A1 Sep. 2, 2004

(30) Foreign Application Priority Data
Nov. 27, 2002 (JP) ............................. 2002-343332

(51) Int. Cl.
B60T 7/12 (2006.01)

(52) U.S. Cl. .......................... 701/96; 701/301; 701/49; 180/171; 180/178

(58) Field of Classification Search .................. 701/96, 701/301
See application file for complete search history.

(56) References Cited

U.S. PATENT DOCUMENTS

| | | | |
|---|---|---|---|
| 4,491,840 A | | 1/1985 | Nishikawa et al. |
| 5,485,892 A | * | 1/1996 | Fujita ......................... 180/167 |
| 5,629,669 A | | 5/1997 | Asano et al. |
| 5,652,705 A | | 7/1997 | Spiess |
| 6,014,601 A | | 1/2000 | Gustafson |
| 6,420,996 B1 | * | 7/2002 | Stopczynski et al. ........ 342/70 |
| 6,859,731 B2 | * | 2/2005 | Takafuji et al. ............. 701/301 |
| 6,882,915 B2 | * | 4/2005 | Yamamura et al. ........... 701/45 |
| 2002/0044047 A1 | | 4/2002 | Miyakoshi et al. |
| 2002/0152015 A1 | * | 10/2002 | Seto ............................. 701/96 |
| 2002/0161506 A1 | * | 10/2002 | Ishizu et al. .................. 701/96 |
| 2003/0009275 A1 | * | 1/2003 | Koike .......................... 701/93 |
| 2003/0135317 A1 | * | 7/2003 | Hijikata et al. ............... 701/70 |
| 2003/0149521 A1 | * | 8/2003 | Minowa et al. ............... 701/70 |
| 2004/0085197 A1 | * | 5/2004 | Watanabe et al. ........... 340/435 |

(Continued)

FOREIGN PATENT DOCUMENTS

DE 101 41 920 A1 3/2002

(Continued)

OTHER PUBLICATIONS

Li et al., "Study on Rear-end Collision Avoidance Technology", Journal of Xi'an Highway University, vol. 21, No. 2 Apr. 2001, pp. 94-97, Tsinghua Tongfang Optical Disc Co., Ltd.

(Continued)

*Primary Examiner*—Thomas Black
*Assistant Examiner*—Brian J. Broadhead
(74) *Attorney, Agent, or Firm*—McDermott Will & Emery LLP

(57) ABSTRACT

A vehicle driving assist system of the present invention detects a vehicle condition and a traveling environment of a subject vehicle; and calculates an extent of influence on the subject vehicle due to future changes in surrounding environment. The vehicle driving assist system then calculates the risk potential around the subject vehicle based on the extent of influence. Operation reaction force of an accelerator pedal is controlled according to the risk potential thus calculated.

14 Claims, 6 Drawing Sheets

U.S. PATENT DOCUMENTS

2004/0153217 A1 * 8/2004 Mattes et al. .................. 701/1

FOREIGN PATENT DOCUMENTS

| | | |
|---|---|---|
| DE | 010118707 A1 * | 10/2002 |
| JP | 59-105587 | 6/1984 |
| JP | 59-152157 | 10/1984 |
| JP | 02-246838 | 10/1990 |
| JP | 03-092436 | 4/1991 |
| JP | 03-260900 | 11/1991 |
| JP | 07-065294 | 3/1995 |
| JP | 7-257302 | 10/1995 |
| JP | 10-151959 | 6/1998 |
| JP | 10-166889 | 6/1998 |
| JP | 10-166890 | 6/1998 |
| JP | 10-211886 | 8/1998 |
| JP | 2000-052809 A | 2/2000 |
| JP | P2000-54860 A | 2/2000 |
| JP | 2001-310649 | 11/2001 |
| JP | 2001-347936 | 12/2001 |
| JP | 2002-019485 | 1/2002 |
| JP | 2002-67843 | 3/2002 |
| JP | 2002-137649 | 5/2002 |
| JP | 2002-163797 | 6/2002 |
| JP | 2002-323830 | 11/2002 |
| WO | WO 02/083470 A1 * | 10/2002 |

OTHER PUBLICATIONS

European Search Report issued in corresponding European Patent Application No. EP 03 02 6504, dated Dec. 1, 2006.

* cited by examiner

Fig.7

| EMBODI-MENT | BASE EQUATION | RP CALCULATION EQUATION | CHARACTERISTICS |
|---|---|---|---|
| 1 | $P = \dfrac{1}{THW}$ | $RP_1 = \alpha_1 P + \beta_1 P'$ | ACCELERATION AND DECELERATOIN OF SUBJECT VEHICLE TAKEN INTO ACCOUNT |
| 2 | | $RP_2 = \alpha_2 P + \beta_2 P' + \gamma_2 P''$ | ACCELERATION AND DECELERATOIN OF SUBJECT VEHICLE TAKEN INTO ACCOUNT<br><br>ACCELERATION AND DECELERATOIN OF PRECEDING VEHICLE TAKEN INTO ACCOUNT |
| 3 | $Q = \dfrac{1}{TTC}$ | $RP_3 = \alpha_3 \int Q\,dt + \beta_3 Q$ | GENERAL REACTION FORCE DETERMINED ACCORDING TO VEHICLE DISTANCE |
| 4 | | $RP_4 = \alpha_4 \int Q\,dt + \beta_4 Q + \gamma_4 Q'$ | GENERAL REACTION FORCE DETERMINED ACCORDING TO VEHICLE DISTANCE<br><br>ACCELERATION AND DECELERATOIN OF SUBJECT VEHICLE TAKEN INTO ACCOUNT |

DRIVING ASSIST SYSTEM FOR VEHICLE

BACKGROUND OF THE INVENTION

1. Field of the Invention

The present invention relates to a driving assist system for a vehicle that assists operations by a driver, to a vehicle provided with such a system and a method for calculating risk potential.

2. Description of Related Art

Systems employed to assist driver operations in the related art include the system disclosed in Japanese Laid Open Patent Publication No. 2000-54860. This system adjusts reaction force generated when an accelerator pedal is operated, based on a distance between a subject vehicle and a preceding vehicle detected by laser radar or the like during automatic cruise control. If the detected distance between vehicles is smaller than a predetermined value, this system sets accelerator pedal reaction force to become strong to warn the driver. During automatic cruise control the accelerator reaction force is set strong so that the driver can rest his foot on the accelerator pedal.

SUMMARY OF THE INVENTION

However, the above described system issues a warning in the event that the subject vehicle approaches close to the preceding vehicle, and it is difficult to reflect the risk actually perceived by the driver in accelerator reaction force control.

The present invention is to provide a driving assist system for a vehicle capable of conveying a risk potential in a manner appropriate to the state of the driver's perception.

A driving assist system for a vehicle according to the present invention comprises: a state recognition device that detects a vehicle condition and a traveling environment of a subject vehicle; a future state prediction device that calculates a current degree of proximity to a preceding vehicle and/or an extent of influence on the subject vehicle due to future changes in surrounding environment to predict future driving conditions, based on detection results of the state recognition device; and a risk potential calculating device that calculates risk potential around the subject vehicle based on the future driving conditions predicted by the future state prediction device and a driver's intentions.

A driving assist system for a vehicle according to the present invention comprises: a state recognition means for detecting a vehicle condition and a traveling environment of a subject vehicle; a future state prediction means for calculating a current degree of proximity to a preceding vehicle and/or an extent of influence on the subject vehicle due to future changes in surrounding environment to predict future driving conditions, based on detection results of the state recognition means; and a risk potential calculating means for calculating risk potential around the subject vehicle based on the future driving conditions predicted by the future state prediction means and a driver's intentions.

A vehicle according to the present invention comprises: a vehicle operating unit; a state recognition device that detects a vehicle condition and a traveling environment of a subject vehicle; a future state prediction device that calculates a current degree of proximity to a preceding vehicle and/or an extent of influence on the subject vehicle due to future changes in surrounding environment to predict future driving conditions, based on detection results of the state recognition device; a risk potential calculating device that calculates risk potential around the subject vehicle based on the future driving conditions predicted by the future state prediction device and a driver's intentions; a reaction force calculating device that calculates an operation reaction force to be generated in the vehicle operating unit according to the risk potential calculated by the risk potential calculating device; and a reaction force generating device that generates the operation reaction force calculated by the reaction force calculating device in the vehicle operating unit.

A method for calculating risk potential according to the present invention detects a vehicle condition and a traveling environment of a subject vehicle; predicts future driving conditions by calculating a current degree of proximity to a preceding vehicle and/or an extent of influence on the subject vehicle due to future changes in surrounding environment based on the vehicle conditions and the traveling environment having been detected; and calculates the risk potential around the subject vehicle based on the predicted future driving conditions and a driver's intentions.

BRIEF DESCRIPTION OF THE DRAWINGS

FIG. 7 is a table of risk potential equations.

DESCRIPTION OF THE PREFERRED EMBODIMENT

First Embodiment

Figure 1:
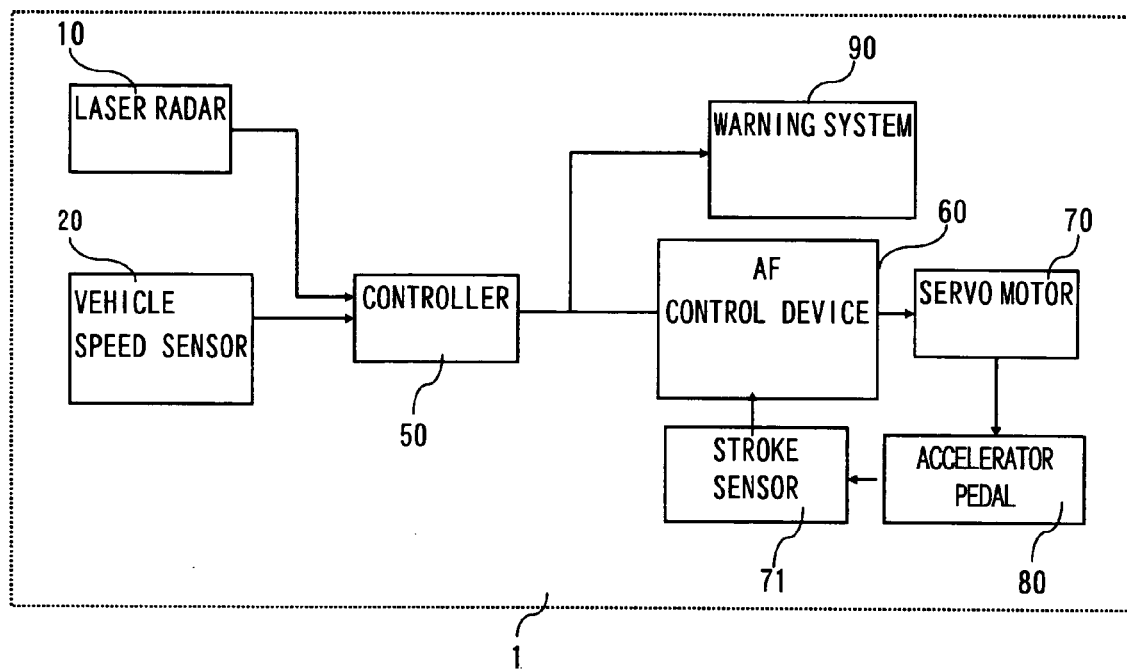
FIG. 1 is a block diagram showing the structure of a driving assist system for a vehicle according to an embodiment of the present invention.
Figure 2:
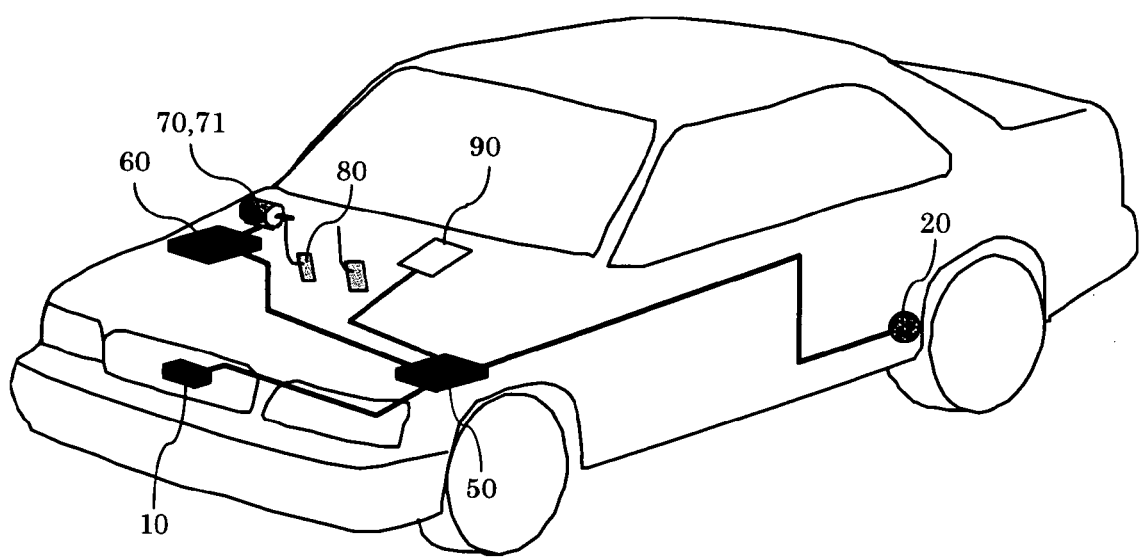
FIG. 2 is a structural diagram of a vehicle fitted with the vehicle driving assist system shown in FIG. 1.

FIG. 1 shows the structure of a vehicle driving assist system 1 of the first embodiment of the present invention, and FIG. 2 is a structural diagram of a vehicle fitted with the vehicle driving assist system 1.

First of all, the structure of the vehicle driving assist system will be described.

A laser radar 10 is attached to a front grill of the vehicle or to a bumper etc., and propagates infrared pulses in a forward horizontal direction for scanning. The laser radar 10 measures reflected radiation of infrared pulses reflected by a plurality of reflecting objects ahead, such as the rear of a vehicle in front, and detects distance (vehicle distance) from the subject vehicle to a preceding vehicle and relative velocity (relative speed) of vehicles based on the elapsed time the reflected radiation to be received. The laser radar 10 outputs the detected vehicle distance and relative speed between vehicles to a controller 50. The laser radar 10 can scan the forward region which is about 6 degrees each side of an axis parallel to the vehicle longitudinal centerline, and objects existing within this range are detected.

A vehicle speed sensor 20 detects traveling speed of the subject vehicle from rotational speed of a wheel thereof etc., and outputs the vehicle speed to the controller 50.

The controller 50 comprises a CPU and CPU peripheral devices, such as ROM, RAM etc., and performs overall control of the vehicle driving assist system.

The controller 50 calculates risk potential relative to the preceding vehicle traveling in front of the subject vehicle based on signals of, such as the vehicle speed, the vehicle distance and the relative speed between vehicles input from the vehicle speed sensor 20 and the laser radar 10. The controller 50 then outputs reaction force command values to an accelerator pedal reaction force control device (AF control device) 60 based on the calculated risk potential.

Figure 3:
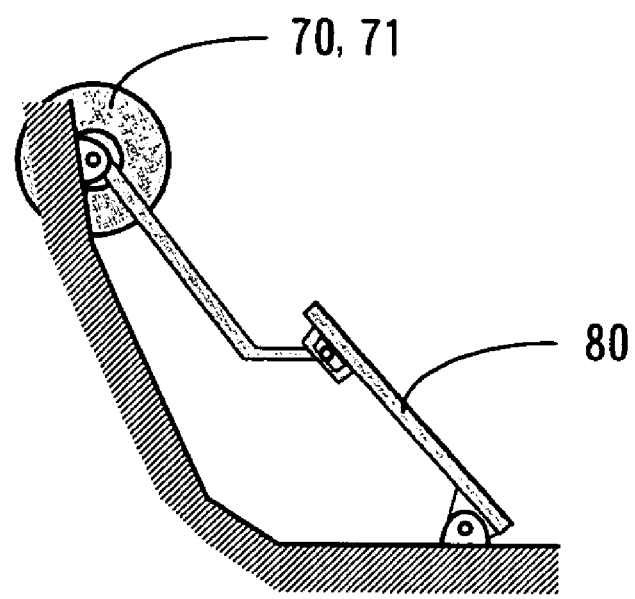
FIG. 3 is a structural diagram of an accelerator pedal and the vicinity thereof.

The AF control device 60 controls accelerator pedal reaction force in response to the command values from the controller 50. As shown in FIG. 3, a servo motor 70 and an accelerator pedal stroke sensor 71 are connected to an accelerator pedal 80 via a link mechanism. The servo motor 70 controls torque and rotation angle thereof in response to commands from the AF control device 60 so as to control the reaction force generated when the driver operates the accelerator pedal 80. The accelerator pedal stroke sensor 71 detects an operation amount S of the accelerator pedal 80 converted to a rotation angle of the servo motor 70 through the link mechanism.

Figure 6:
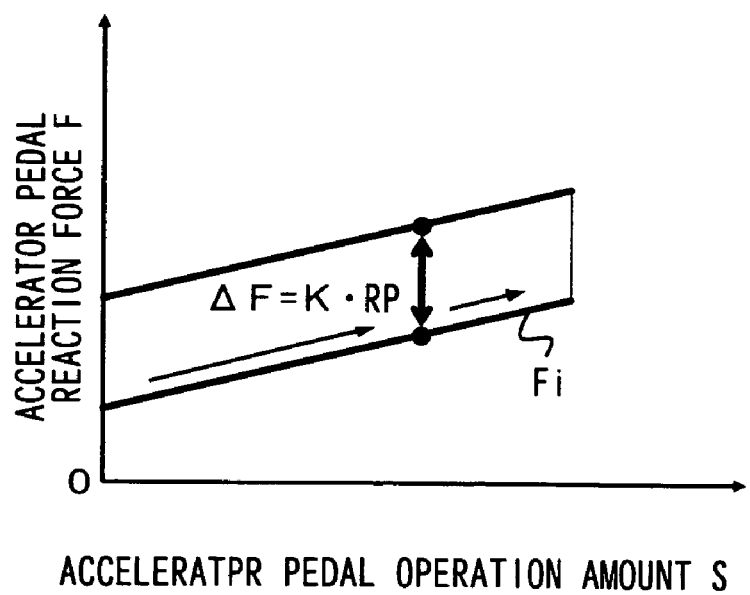
FIG. 6 is a figure showing a relationship between an accelerator pedal operation amount and an accelerator pedal reaction force.

When the accelerator pedal reaction force control according to the risk potential is not being performed, the accelerator pedal reaction force F may increase linearly along with increase of the operation amount S of the accelerator pedal 80 as shown in FIG. 6. The function Fi of the accelerator pedal reaction force F with respect to the accelerator pedal operation amount S when the accelerator pedal reaction force control is not being carried out is taken as being a normal reaction force characteristic. The normal reaction force characteristic Fi may be obtained, for example, by spring force of a torsion spring (not shown in the drawings) provided at the center of rotation of the servo motor 70.

A warning system 90 notifies the risk potential relative to the preceding vehicle to the driver in response to a signal from the controller 50. The warning system 90 has, for instance, a display monitor and a warning buzzer.

Figure 4:
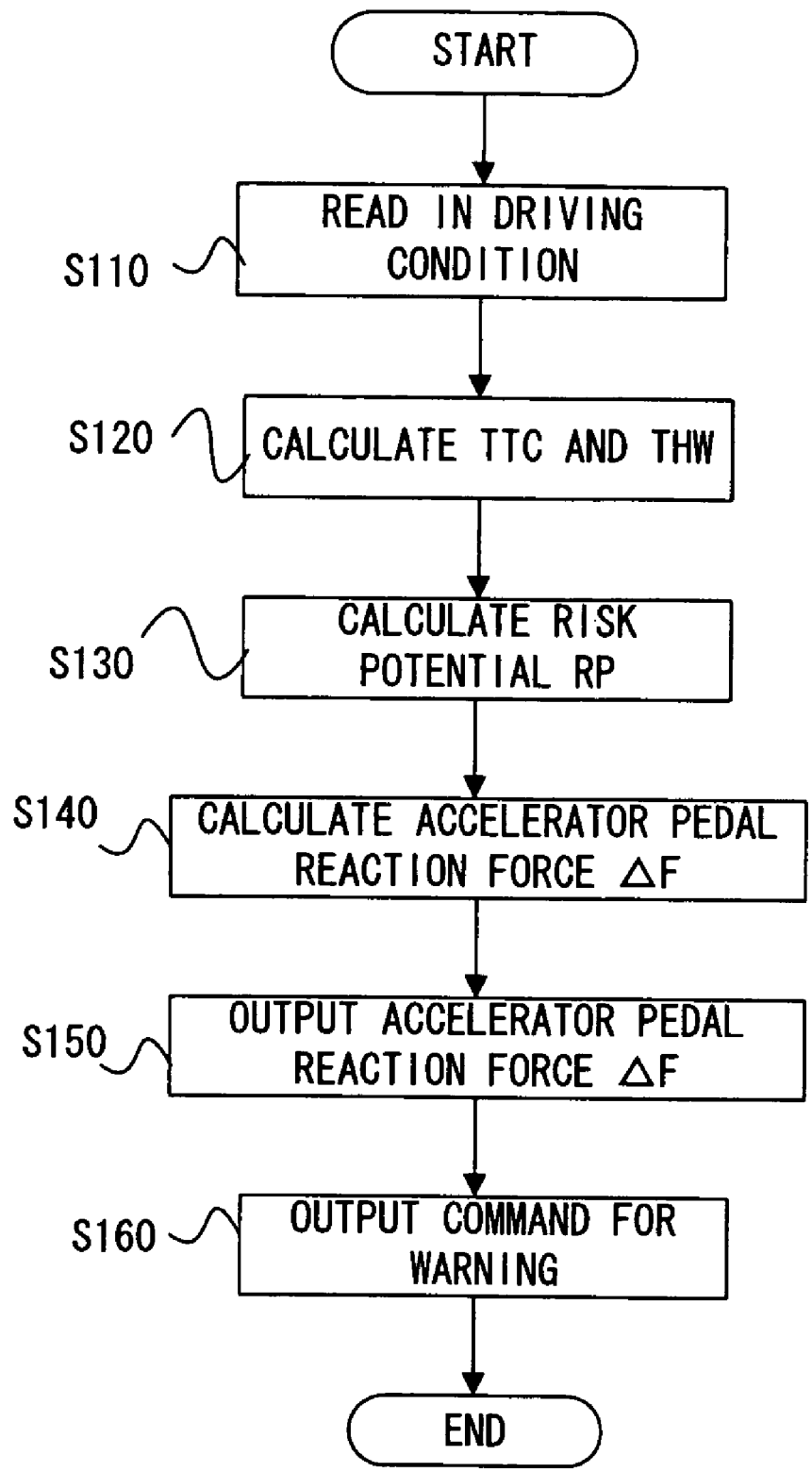
FIG. 4 is a flow chart showing the procedural flow of a drive operation assist control program executed in a controller of an embodiment of the present invention.

Next, operation of the vehicle driving assist system 1 of the present invention will be described. FIG. 4 is a flow chart showing the procedural flow of a drive operation assist control program executed in the controller 50. These processing procedures are executed continuously at predetermined time intervals of, e.g., 50 msec.

Figure 5:
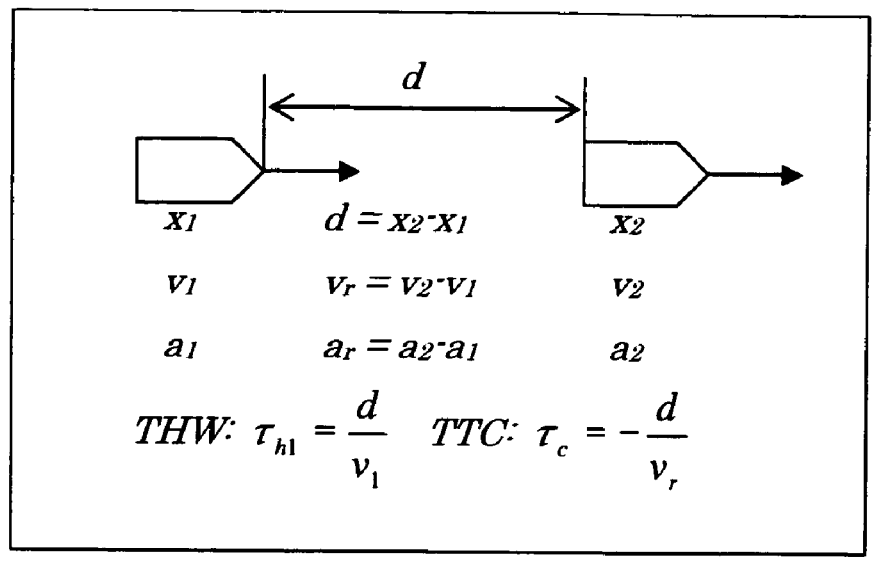
FIG. 5 schematically illustrates traveling conditions of a vehicle and a preceding vehicle.

In step S110, the controller 50 reads driving conditions of the subject vehicle and the vehicle surroundings from the laser radar 10 and the vehicle speed sensor 20. FIG. 5 schematically illustrates traveling conditions of the subject vehicle and the preceding vehicle. Parameters representing the traveling conditions of the subject vehicle are the followings: current position x1 of the subject vehicle in the longitudinal direction, vehicle speed v1, and vehicle acceleration a1. Parameters representing the traveling conditions of the preceding vehicle are the followings: current position x2 of the preceding vehicle in the longitudinal direction, preceding vehicle speed v2, and preceding vehicle acceleration a2. A distance d between the subject vehicle and the preceding vehicle, relative speed vr, and relative acceleration ar are d=x2−x1, vr=v2−v1, and ar=a2−a1, respectively.

In step S120, a degree of proximity to the vehicle currently in front of the subject vehicle and a predicted extent of influence on the subject vehicle due to changes in surrounding environment from now on are calculated using the parameters of the driving conditions read in step S110. Here, time to contact (TTC) is calculated as the degree of proximity to the preceding vehicle and time headway (THW) is calculated as the predicted extent of influence.

TTC is a physical quantity representing current degree of proximity of the subject vehicle to the preceding vehicle. In the case where current driving conditions are continuous, that is, when the subject vehicle speed v1, the preceding vehicle speed v2 and the relative speed vr are constant, TTC indicates how many seconds later the vehicle distance d will become zero and the subject vehicle and the preceding vehicle come into contact with each other. TTC can be obtained from the following expression 1.

$$TTC{:}\tau c = -d/vr \qquad \text{(expression 1)}$$

As the value of TTC becomes smaller, the degree of proximity to the preceding vehicle becomes greater, which indicates tens situation with possible contact between the subject vehicle and the preceding vehicle. For example, when the subject vehicle approaches towards the preceding vehicle, it is known that most drivers start a deceleration operation before TTC becomes less than four seconds.

THW is a physical quantity representing the predicted extent of influence on TTC due to future change in the preceding vehicle speed while the subject vehicle is following the preceding vehicle. In other words, THW represents the extent of influence upon TTC when it is assumed that the relative velocity vr will change. THW is represented by the following expression 2.

$$THW{:}\tau h = d/v1 \qquad \text{(expression 2)}$$

THW is obtained by dividing the vehicle distance d by the subject vehicle speed v1, and represents a period of time until the subject vehicle reaches the current position of the preceding vehicle. As the THW becomes larger, the predicted degree of influence with respect to changes in surrounding environment becomes smaller. That is, if THW is large, there is not a lot of influence on the degree of proximity to preceding vehicle even if the preceding vehicle velocity v2 changes in the future, indicating that TTC does not vary a great deal. It should be understood that, if the subject vehicle follows the preceding vehicle at the subject vehicle speed v1 equal to the preceding vehicle speed v2, it is also possible to calculate THW by substituting the preceding vehicle speed v2 for the subject vehicle speed v1 in expression 2.

In step S130, the risk potential RP with respect to the preceding vehicle is calculated using TTC and THW calculated in step S120. The method of calculating the risk potential RP will be described later.

In step S140, an accelerator pedal reaction force increase amount (AF increase amount) ΔF is calculated based on the risk potential RP calculated in step S130. The AF increase amount ΔF increases as the risk potential RP becomes greater. For instance, the AF increase amount ΔF is set so as to be proportional to the risk potential RP (ΔF=k ×RP).

Next, in step S150, the AF increase amount ΔF calculated in step S140 is output to the AF control device 60. The AF control device 60 controls the servo motor 70 according to a command from the controller 50. FIG. 6 shows a relationship between the accelerator pedal operation amount S and the accelerator pedal reaction force F. The reaction force F which is obtained by adding the AF increase amount ΔF to the normal reaction force characteristic Fi is generated at the accelerator pedal 80 by drive of the servo motor 70. As a result, a larger pedal reaction force F is generated as the risk potential RP becomes greater.

In step S160, an operation command is output to the warning system 90 such as a display monitor and a warning buzzer according to the risk potential RP. For instance, if the risk potential RP exceeds a predetermined value, commands are issued for sounding a warning buzzer and displaying a magnitude of the risk potential RP to a display monitor. The processing for this time then terminates.

In this way, the risk potential RP is recognized by the driver by controlling the accelerator pedal reaction force and outputting a warning according to the risk potential RP. Moreover, by conveying the risk potential RP in the vehicle surroundings, the driver is assisted and prompted to operate a vehicle in an appropriate manner.

A method of calculating the risk potential RP in the first embodiment is described in the following. The risk potential RP with respect to the preceding vehicle may be calculated using TTC and THW with the following expression 3. The Risk potential RP calculated by using expression 3 is taken as RP0.

$$RP0 = a/THW + b/TTC \quad \text{(expression 3)}$$

Here, a reciprocal of TTC (1/TTC) represents the degree of proximity to the preceding vehicle, and a reciprocal of THW (1/THW) represents the predicted extent of influence upon the subject vehicle. Here, a and b are constants for appropriate weighting of the extent of influence and the degree of proximity respectively, and are set, for example, to a=1 and b=8 (a<b).

By calculating the risk potential RP0 using expression 3, it is possible to represent the degree of closeness corresponding to continuous variations in the driving state, from while following the preceding vehicle to when approaching closely to the preceding vehicle.

This risk potential RP0 is only defined using current values of THW and TTC. That is, the risk potential RP0 represented using expression 3 is only defined using the vehicle distance d, the current subject vehicle speed v1 and the preceding vehicle speed v2. Thus, even when the subject vehicle approaches the preceding vehicle while the driver is accelerating, or while the driver is decelerating, the same value of the risk potential RP0 will be calculated as long as the vehicle distance d and the vehicle speeds v1 and v2 are the same.

However, even if the risk potential RP0 has the same value, in the case of accelerating and approaching the preceding vehicle, the driver senses high risk since it is expected that the preceding vehicle will be closer in future. On the other hand in the case of decelerating and approaching the preceding vehicle the driver senses low risk compared to the case of acceleration. Accordingly, if accelerator pedal reaction force control or approach warning announcement is carried out based on the risk potential RP0 which is calculated using expression 3 and is a risk different to the actual risk perceived by the driver, it may give the driver a strange feeling. Also, in a situation where the preceding vehicle suddenly decelerates, the driver predicts that future risk will increase depending on degree of deceleration of the preceding vehicle, and perceives a great risk. However, with the risk potential RP0 of expression 3, the degree of acceleration a2 of the preceding vehicle is not taken into account.

With the vehicle driving assist system 1 according to an embodiment of the present invention, in calculation of the risk potential RP the driver's intentions are added to calculate a risk potential equivalent to the risk actually perceived by the driver so that odd feeling of the driver are reduced when carrying out accelerator pedal reaction force control or warning output. In particular, the vehicle driving assist system 1 of an embodiment estimates the driver's intentions from acceleration and deceleration of the subject vehicle, or from acceleration and deceleration of the subject vehicle and the preceding vehicle to calculate the risk potential RP. Furthermore, in situations such as sudden deceleration or acceleration of the preceding vehicle, operation reaction force control and warning announcement are carried out without giving the driver an uncomfortable feeling.

FIG. 7 is a table of risk potential calculation equations for the first to fourth embodiments which will be described hereinafter.

First of all, in the first embodiment, the drivers speed change intentions are included in the risk potential calculation using speed adjustment rate (a degree of acceleration or deceleration) of the subject vehicle. In the following, a method of calculating the risk potential RP in the first embodiment will be described in detail.

Here, a reciprocal of THW, P=1/THW, will be used as a base equation for calculating the risk potential RP. A risk potential RP1 of the first embodiment is represented by expression 4 below, using the base equation P.

$$RP1 = \alpha 1 \times P + \beta 1 \times P' \quad \text{(expression 4)}$$

Here, $\alpha 1$ and $\beta 1$ are constants for applying a appropriate weight to P and P', respectively. P' represents a differentiated value of the base equation P.

As shown in expression 4, the risk potential RP1 can be obtained from a linear sum of the base equation P and the once differentiated base equation P'. If expression 4 is computed using parameters shown in FIG. 5, it is represented as shown in expression 5 below.

$$RP_1 = \frac{1}{\tau_h}\left(\alpha_1 + \frac{\beta_1}{\tau_1} + \frac{\beta_1}{\tau_c}\right) \quad \text{(expression 5)}$$

Here, $\tau 1 = v1/a1$.

As shown in expression 5, the risk potential RP1 is calculated using an equation that includes THW=$\tau h$ and TTC=$\tau c$, as well as a term $1/\tau 1$ corresponding to the subject vehicle acceleration a1. In this way, if the subject vehicle acceleration a1 becomes large, the risk potential RP1 will become large. Therefore, even if THW and TTC have the same values, the risk potential RP1 becomes relatively large at the time of acceleration of the subject vehicle, while at the time of deceleration the risk potential RP1 becomes relatively small.

As described above, the controller 50 of the first embodiment detects a vehicle condition and a traveling environment of the subject vehicle, and calculates a current degree of proximity to the preceding vehicle and an extent of influence on the subject vehicle due to predicted future changes in surrounding environment to predict future driving conditions. The controller 50 then calculates the risk potential RP around the subject vehicle based on the future driving conditions, adding the driver's intentions to the future driving conditions. In this manner, in the first embodiment it is possible to precisely convey the risk potential RP of the vehicle surroundings to the driver by controlling operation reaction force generated at the accelerator pedal 80 according to the risk potential RP.

In particular, since, in the first embodiment, the vehicle acceleration a1 directly reflecting the driver's intentions with regard to speed adjustment is included in the risk potential calculation, it is possible to calculate a risk potential equivalent to the risk actually perceived by the driver. In this way, reaction force characteristics of the accelerator pedal 80 are consistent with conditions at that time, namely the current traveling conditions of the subject vehicle and the driver's perceptions. Therefore, accelerator pedal reaction force control can be carried out, reducing adverse effects on the driver.

Also, since the warning system 90 is operated according to the risk potential RP calculated as described above, it is possible to carry out a precise warning operation as well as accelerator reaction force control.

As has been described above, in the first embodiment, the risk potential RP is calculated using a reciprocal of THW. Specifically, the risk potential RP is calculated by adding a reciprocal of THW and a differentiated value of the reciprocal of THW. In this way, the acceleration a1 of the subject vehicle is reflected in the risk potential RP, and it is possible to carry out reaction force control that reflects the perception of the driver inside the vehicle.

For calculation of the risk potential RP1 in the controller 50, either expression 4 or expression 5 can be suitably selected depending on conditions of the CPU of the controller 50 or the structure of the laser radar 10 and the vehicle speed sensor 20 for detecting the driving conditions.

In the case of using expression 4, a value for the base equation P=1/THW is stored in a memory of the controller 50 together with elapsed time, and the risk potential RP is calculated by directly obtaining a differentiated value for the base equation P through time variation of the base equation P. Thus, the risk potential RP taking account of continuity of the risk potential from the past can be calculated.

In the case of using expression 5, it is possible to calculate a timely risk potential RP by calculating a risk potential RP1 from actually detected current subject vehicle speed v1, preceding vehicle speed v2, distance between vehicles d and subject vehicle acceleration a1.

Second Embodiment

Next, a method of calculating the risk potential RP of a second embodiment will be described.

In the second embodiment, in addition to speed adjustment (acceleration or deceleration) of the subject vehicle, speed adjustment of the preceding vehicle is also used to calculate the risk potential RP so that adverse effects on the driver can be reduced even when the preceding vehicle suddenly accelerates or decelerates.

A risk potential RP2 of the second embodiment is represented by expression 6 below using the base equation P.

$$RP2 = \alpha2 \times P + \beta2 \times P' + \gamma2 \times P''$$ (expression 6)

Here, $\alpha2$, $\beta2$, and $\gamma2$ are constants for respectively applying appropriate weight to P, P', and P''. P' and P' represent once differentiated value and twice differentiated value of the base equation P respectively.

As shown in expression 6, the risk potential RP2 is obtained from a linear sum of the base equation P, the base equation P differentiated once and the base equation P differentiated twice. If expression 6 is computed using the parameters shown in FIG. 5, it is represented as expression 7 below.

$$RP_2 = \frac{1}{\tau_h}\left(\alpha_2 + \frac{\beta_2}{\tau_1}\right) + \frac{1}{\tau_c}\left(\beta_2 + \frac{\gamma_2}{\tau_r} + \frac{2\gamma_2}{\tau_1} + \frac{2\gamma_2}{\tau_c}\right)$$ (expression 7)

Here, $\tau r = vr/ar$.

As shown in expression 7, the risk potential RP2 is calculated using an equation including THW=$\tau h$, TTC=$\tau c$, and also a term corresponding to the subject vehicle acceleration a1. In this way, if the subject vehicle acceleration a1 becomes large, the risk potential RP2 becomes large. Accordingly, even if THW and TTC have the same values, the risk potential RP2 becomes relatively large at the time of vehicle acceleration, and the resulting value calculated for the risk potential RP2 at the time of vehicle deceleration is comparatively small. Also, the risk potential RP2 includes a term $1/\tau r$ corresponding to the relative acceleration ar between the subject vehicle and the preceding vehicle. Therefore, even if the vehicle acceleration a1 is the same value, when the preceding vehicle decelerates, the risk potential RP2 will become large.

Therefore, in the second embodiment, since the vehicle acceleration a1 and the preceding vehicle acceleration a2 are included in risk potential calculation, it is possible, in addition to the effects of the first embodiment described above, to calculate the risk potential RP taking into account the movement of the preceding vehicle. In this way, it is possible to calculate a risk potential equivalent to risk actually perceived by the driver in situations such as sudden deceleration of the preceding vehicle. As a result, it is possible to carry out accelerator pedal reaction force control and warning operation that have a reduced adverse effect on the driver.

Similarly to the first embodiment, for calculation of the risk potential RP2 in the controller 50, either expression 6 or expression 7 can be suitably selected depending on the specifications of the controller 50.

Third Embodiment

A method of calculating the risk potential RP of a third embodiment of the present invention will now be described.

In the third embodiment, a reciprocal of TTC, Q=1/TTC is used as a base equation for calculating the risk potential RP. A risk potential RP3 of the third embodiment is represented by the following expression 8 using the base equation Q.

$$RP_3 = \alpha_3 \int Qdt + \beta_3 Q$$ (expression 8)

Here, $\alpha3$ and $\beta3$ are constants for applying a suitable weight to $\int Qdt$ and Q respectively.

As shown in expression 8, the risk potential RP3 can be obtained from a linear sum of the base equation Q, and the base equation Q integrated once. If expression 8 is computed using the parameters shown in FIG. 5, it is represented as shown in expression 9 below.

$$RP_3 = C_3 - \alpha_3 \log|d| + \frac{\beta_3}{\tau_c}$$ (expression 9)

Here, C3 is a constant.

As shown in expression 9, the risk potential RP3 is calculated using an equation that includes TTC=$\tau c$ and the vehicle distance d.

Generally, in a medium to high speed range above a predefined vehicle velocity, a driver will carry out a driving operation to maintain a fixed THW with respect to a preceding vehicle regardless of vehicle speed. On the other hand, in the case of low vehicle speed, for example at less than 40 km/h, a driver will not maintain a fixed THW but tend to drive to maintain the distanced to the preceding vehicle at a constant value without worrying about vehicle speed.

The risk potential RP3 is calculated not using THW but using a logarithm of the distance d between the subject vehicle and the preceding vehicle, and a reciprocal of TTC. The value calculated for the risk potential RP3 becomes larger as the distance d between vehicles becomes smaller. In this way, particularly in a region where vehicle speed is low, it is possible to calculate a risk potential close to the actual perception of the driver.

In this way, it is possible to set a general pedal reaction force according to the vehicle distance d by including the distance d between vehicles in the risk potential calculation.

In addition, since the risk potential RP is calculated taking the relative speed into consideration, it is possible to more accurately set pedal reaction force. In the third embodiment, it is possible to calculate a risk potential equivalent to the risk actually perceived by a driver. As a result, it is possible to carry out accelerator pedal reaction force control and a warning operation that does not give the driver an uncomfortable feeling.

Similarly to the first embodiment, for calculation of the risk potential RP3, either expression 8 or expression 9 can be appropriately selected depending on the specification of the controller 50.

Fourth Embodiment

Next, a method of calculating the risk potential RP in a fourth embodiment of the present invention will be described.

A risk potential RP4 of the fourth embodiment is represented by expression 10 using the base equation Q.

$$RP_4 = \alpha_4 \int Q dt + \beta_4 Q + \gamma_4 Q' \quad \text{(expression 10)}$$

Here, $\alpha 4$, $\beta 4$, and $\gamma 4$ are constants for applying appropriate weight to $\int Q dt$, Q, and Q' respectively. Q' represents a differentiated value of the base equation Q.

As shown in expression 10, the risk potential RP4 can be obtained from a linear sum of the base equation Q, an equation of the base equation Q integrated once, and an equation of the base equation Q differentiated once. If expression 10 is computed using the parameters shown in FIG. 5, it is represented as shown in expression 11 below.

$$RP_4 = C_4 - \alpha_4 \log|d| + \frac{1}{\tau_c}\left(\beta_4 + \gamma_4\left(\frac{1}{\tau_c} - \frac{1}{\tau_n}\right)\right) \quad \text{(expression 11)}$$

Here, C4 is a constant, and $\tau n = -vr/a1$.

As shown in FIG. 11, the risk potential RP4 is calculated using an equation that includes TTC=$\tau c$ and the vehicle distance d, and also a term $1/\tau n$ corresponding to the subject vehicle acceleration a1. Therefore, if the subject vehicle acceleration a1 becomes large, the risk potential RP4 becomes large. Accordingly, even if TTC and the vehicle distance d have the same values, the risk potential RP4 becomes relatively large at the time of vehicle acceleration, and becomes relatively small at the time of vehicle deceleration.

In the fourth embodiment, since a differentiated value of the reciprocal of TTC is used, it is possible to calculate the risk potential taking into consideration speed adjustment of the subject vehicle. In this way, by including the vehicle distance d and the subject vehicle acceleration a1 in risk potential calculation, it is possible to set a general pedal reaction force according to the distance d between vehicles. In addition, it is possible to set a more precise pedal reaction force by calculating the risk potential RP according to speed adjustment of the subject vehicle.

As well as being able to obtain the same results as for the third embodiment described above, it is therefore possible to calculate a risk potential equivalent to risk actually perceived by the driver. As a result, it is possible to carry out accelerator pedal reaction force control and a warning operation that does not give the driver a strange feeling.

Similarly to the first embodiment, for calculation of the risk potential RP4, either expression 10 or expression 11 can be appropriately selected depending on the specification of the controller 50.

In the first through fourth embodiments described above, a risk potential RP is notified to a driver using accelerator pedal reaction force and a warning. But it is also possible to notify the risk potential RP to a driver using either the accelerator pedal reaction force or the warning. The explanation was given to an example that the warning buzzer and the display monitor were used as the warning system 90, but it is also possible to use either of them.

It is also possible to carry out further brake pedal reaction force control using a risk potential RP calculated as described above. Alternatively, it is possible to carry out only one of either accelerator pedal reaction force control or the brake pedal reaction force control based on the risk potential RP.

In the first through fourth embodiments described above, the AF increase amount $\Delta F$ is set to be proportional to the risk potential RP. However, the present invention is not limited to this feature, and it is also possible to set the AF increase amount $\Delta F$ to increase according to an exponential function with respect to the risk potential RP.

In the first through fourth embodiment described above, the laser radar 10 and the vehicle speed sensor 20 are used to detect the vehicle conditions and the driving environment in the vehicle surroundings. However, the present invention is not thus limited, and it is also possible to use, for example, other type of detectors instead of the laser radar 10 such as milliwave radar, a CCD camera or a CMOS camera.

The above described embodiments are examples, and various modifications can be made without departing from the spirit and scope of the invention.

The disclosure of the following priority application is herein incorporated by reference:

Japanese Patent Application No. 2002-343332 filed Nov. 27, 2002.

What is claimed is:

1. A driving assist system for a vehicle comprising:
   a state recognition device that detects a vehicle condition and a traveling environment of a subject vehicle;
   a future state prediction device that predicts future driving conditions, the predicting including calculating at least one of a current degree of proximity to a preceding vehicle and an extent of influence on the subject vehicle due to future changes in surrounding environment, the calculating being based on detection results of the state recognition device; and
   a risk potential calculating device that calculates risk potential around the subject vehicle based on the future driving conditions predicted by the future state prediction device and a driver's intentions;
   wherein:
   the state recognition device detects the vehicle condition and the traveling environment of the subject vehicle including a subject vehicle speed, a preceding vehicle speed, and a distance between the subject vehicle and the preceding vehicle;

the future state prediction device calculates a time headway based on one of a set of the distance between vehicles and the subject vehicle speed and a set of the distance between vehicles and the preceding vehicle speed as the extent of influence due to changes in the surrounding environment; and the risk potential calculating device calculates the risk potential based on a reciprocal of the time headway.

2. A driving assist system for a vehicle according to claim 1, wherein:

the risk potential calculating device calculates the risk potential based on a linear sum of the reciprocal of the time headway and a time differentiated value of the reciprocal of the time headway.

3. A driving assist system for a vehicle according to claim 1, wherein:

the risk potential calculating device calculates based on a linear sum of the reciprocal of the time headway, a time differentiated value of the reciprocal of the time headway, and a twice differentiated value of the reciprocal of the time headway.

4. A driving assist system for a vehicle, comprising:

a state recognition device that detects a vehicle condition and a traveling environment of a subject vehicle;

a future state prediction device that predicts future driving conditions, the predicting including calculating at least one of a current degree of proximity to a preceding vehicle and an extent of influence on the subject vehicle due to future changes in surrounding environment, the calculating being based on detection results of the state recognition device; and a risk potential calculating device that calculates risk potential around the subject vehicle based on the future driving conditions predicted by the future state prediction device and a driver's intentions;

wherein:

the state recognition device detects the vehicle condition and the traveling environment of the subject vehicle including a subject vehicle speed, a preceding vehicle speed, and a distance between the subject vehicle and the preceding vehicle;

the future state prediction device calculates time to contact based on a relative speed and the distance between vehicles detected by the state recognition device as the degree of proximity to the preceding vehicle; and the risk potential calculating device calculates the risk potential based on a reciprocal of the time to contact.

5. A driving assist system for a vehicle according to claim 4, wherein:

the risk potential calculating device calculates the risk potential based on a linear sum of the reciprocal of the time to contact, and a time integrated value of the reciprocal of the time to contact.

6. A driving assist system for a vehicle according to claim 4, wherein:

the risk potential calculating device calculates the risk potential based on a linear sum of the reciprocal of the time to contact, a time integrated value of the reciprocal of the time to contact, and a time differentiated value of the reciprocal of the time to contact.

7. A method for calculating risk potential, comprising:

detecting a vehicle condition and a traveling environment of a subject vehicle;

predicting future driving conditions by calculating at least one of a current degree of proximity to a preceding vehicle and an extent of influence on the subject vehicle due to future changes in surrounding environment based on the vehicle conditions and the traveling environment having been detected; and calculating the risk potential around the subject vehicle based on the predicted future driving conditions and a driver's intentions;

wherein:

a time headway is calculated based on one of a set of a distance between the subject vehicle and the preceding vehicle and a subject vehicle speed and a set of the distance between vehicles and a preceding vehicle speed as the extent of influence due to changes in the surrounding environment; and the risk potential is calculated based on a linear sum of a reciprocal of the time headway and a time differentiated value of the reciprocal of the time headway.

8. A method for calculating risk potential, comprising:

detecting a vehicle condition and a traveling environment of a subject vehicle;

predicting future driving conditions by calculating at least one of a current degree of proximity to a preceding vehicle and an extent of influence on the subject vehicle due to future changes in surrounding environment based on the vehicle conditions and the traveling environment having been detected; and calculating the risk potential around the subject vehicle based on the predicted future driving conditions and a driver's intentions wherein:

a time headway is calculated based on one of a set of a distance between the subject vehicle and the preceding vehicle and a subject vehicle speed and a set of the distance between vehicles and a preceding vehicle speed as the extent of influence due to changes in the surrounding environment; and the risk potential is calculated based on a linear sum of a reciprocal of the time headway, a time differentiated value of the reciprocal of the time headway, and a twice differentiated value of the reciprocal of the time headway.

9. A method for calculating risk potential, comprising:

detecting a vehicle condition and a traveling environment of a subject vehicle;

predicting future driving conditions by calculating at least one of a current degree of proximity to a preceding vehicle and an extent of influence on the subject vehicle due to future changes in surrounding environment based on the vehicle conditions and the traveling environment having been detected; and calculating the risk potential around the subject vehicle based on the predicted future driving conditions and a driver's intentions wherein:

time to contact is calculated based on a relative speed and a distance between the subject vehicle and the preceding vehicle as the degree of proximity to the preceding vehicle; and the risk potential is calculated based on a linear sum of a reciprocal of the time to contact and a time integrated value of the reciprocal of the time to contact.

10. A method for calculating risk potential, comprising:

detecting a vehicle condition and a traveling environment of a subject vehicle;

predicting future driving conditions by calculating at least one of a current degree of proximity to a preceding vehicle and an extent of influence on the subject vehicle due to future changes in surrounding environment based on the vehicle conditions and the traveling environment having been detected; and calculating the risk potential around the subject vehicle based on the predicted future driving conditions and a driver's intentions:

wherein:

time to contact is calculated based on a relative speed and a distance between the subject vehicle and the preceding vehicle as the degree of proximity to the preceding vehicle; and the risk potential is calculated based on a linear sum of a reciprocal of the time to contact, a time integrated value of the reciprocal of the time to contact, and a time differentiated value of the reciprocal of the time to contact.

11. A driving assist system for a vehicle, comprising:

a state recognition device configured to detect a vehicle condition and a traveling environment of a subject vehicle;

a future state prediction device configured to predict future driving conditions by calculating an extent of influence on the subject vehicle due to future changes in surrounding environment based on detection results of the state recognition device; and a risk potential calculating device configured to calculate risk potential around the subject vehicle based on the future driving conditions predicted by the future state prediction device and a driver's intentions.

12. A driving assist system for a vehicle, comprising:

a state recognition means for detecting a vehicle condition and a traveling environment of a subject vehicle;

a future state prediction means for predicting future driving conditions by calculating an extent of influence on the subject vehicle due to future changes in surrounding environment, based on detection results of the state recognition means; and a risk potential calculating means for calculating risk potential around the subject vehicle based on the future driving conditions predicted by the future state prediction means and a driver's intentions.

13. A vehicle, comprising:

a vehicle operating unit;

a state recognition device configured to detect a vehicle condition and a traveling environment of a subject vehicle;

a future state prediction device configured to predict future driving conditions by calculating an extent of influence on the subject vehicle due to future changes in surrounding environment, based on detection results of the state recognition device;

a risk potential calculating device configured to calculate risk potential around the subject vehicle based on the future driving conditions predicted by the future state prediction device and a driver's intentions;

a reaction force calculating device configured to calculate an operation reaction force to be generated in the vehicle operating unit according to the risk potential calculated by the risk potential calculating device; and a reaction force generating device configured to generate the operation reaction force calculated by the reaction force calculating device in the vehicle operating unit.

14. A method for calculating risk potential, comprising:

detecting a vehicle condition and a traveling environment of a subject vehicle;

predicting future driving conditions by calculating an extent of influence on the subject vehicle due to future changes in surrounding environment based on the detected vehicle conditions and the detected traveling environment; and calculating the risk potential around the subject vehicle based on the predicted future driving conditions and a driver's intentions.

* * * * *